Patented Apr. 1, 1941

2,237,017

UNITED STATES PATENT OFFICE 2,237,017

ATTACHING GELATIN LAYERS TO SUPPORTS OF POLYMERIZED VINYLCHLORIDE

Kurt Thinius, Eilenburg, Germany, assignor, by mesne assignments, to Walther H. Duisberg, New York, N. Y.

No Drawing. Application April 13, 1939, Serial No. 267,613. In Germany April 27, 1938

7 Claims. (Cl. 91—69)

My present invention relates to improvements in attaching gelatin layers to supports of polymerized vinylchloride.

Various ways are known for making sheets from polymerizates and mixed polymerizates of vinylchloride with other monomers of the vinyl group which are capable of polymerization, and polymerizates having a chloride component in preponderating proportion. In spite of their good mechanical properties and resistance to water, these sheets have not hitherto been used in the photographic art and allied industries. The reason for this is chiefly that hitherto it has not been possible to secure a sufficient adhesion of gelatin layers which are mostly used as carriers for the light-sensitive materials to the vinyl polymerizate which is to serve as the support.

My present invention has for one object to provide a process of uniting gelatin layers to supports of polymerized vinylchloride, wherein for anchoring the gelatin there is provided an intermediate layer which has an affinity for the vinylchloride polymers and at the same time is compatible with cellulose derivatives, especially nitrocellulose.

Another object of this invention is the provision of an intermediate layer having these properties and consisting of the mixed polymerizates of vinylchloride with esters of the vinyl group in which the ester component is always more than 40 per cent of the mixed polymerizate and may consist of esters either of vinyl alcohol or acrylic acid.

Yet another object of the invention is to provide a material which comprises an intermediate layer containing the mixed polymerizates described above.

Further objects of my invention will appear more in detail hereinafter.

The intermediate layers are most simply prepared by application of a dispersion of the said mixed polymerizate and nitrocellulose on the aforesaid support in known manner, the dispersion being either in the form of a colloid solution or in the form of an emulsion. Alternatively, the intermediate layer may be applied to the support and united thereto by means of heat and pressure. If desired, there may be first applied a layer of the mixed polymerizate of vinylchloride containing more than 40 per cent of ester component and then a nitrocellulose layer of any desired thickness.

When the gelatin is applied to this intermediate layer in the usual manner the gelatin layer becomes firmly anchored.

The invention is illustrated by the following examples:

Example 1.—A sheet of polymerized vinylchloride or a mixture of polymerized vinylchloride and after-chlorinated polymerized vinylchloride of 0.2 mm. thickness is thinly lacquered once with a lacquer of 5 per cent strength made from equal parts of highly viscous nitrocellulose and mixed polymerizate from 54 per cent of vinylchloride and 46 per cent of vinylacetate dissolved in a mixture of 45 per cent of acetone, 25 per cent of ethyl acetate, 25 per cent of toluene and 5 per cent of an acetic acid ester of an aliphatic alcohol having more than 5 carbon atoms, for instance a hexylalcohol or heptylalcohol. After the lacquer has dried, the light-sensitive gelatin emulsion layer is applied, for which purpose the known method used for applying emulsions to nitrofilms may be employed. The anchoring of the gelatin layer on the sheet of polymerized vinylchloride is fast.

Instead of the polymerized vinylchloride sheet which is only opaque, there may be used transparent sheets made from the mixed polymerizate from vinylchloride and acrylic acid methyl ester (80:20).

Example 2.—On the support specified in Example 1 there is first produced a layer from an emulsion of 40 per cent strength of the threefold mixed polymerizate from vinylchloride, vinylacetate and acrylic acid butyl ester (1:1:1). This layer, after evaporation of the water, is coated with a nitrocellulose lacquer of low concentration made from a highly viscous collodion cotton (3 per cent of highly viscous nitrocellulose containing about 12.2 per cent of nitrogen in the solvent specified in Example 1). The gelatin layer is then anchored by this intermediate layer.

The intermediate layer may be applied directly after the thermoplastic rolling of the vinylchloride polymer, whereupon the preparation of the substratum may be subsequently performed.

This continuous operation may be specially recommended when the sheet of support is made by casting a polymerized vinylchloride, in which case there is especially suitable the more soluble mixed polymerizate of vinylchloride with maleic acid, methyl acrylic acid or the after-chlorinated polymerized vinylchloride.

The sheets provided with the gelatin layers as herein described are useful, for instance, as carriers for negative or positive pictures, characters and sound records.

I claim:

1. In the process of coating a gelatin layer on top of a support consisting of polymerized vinyl chloride, the improvement which comprises inserting an intermediate layer between said gelatin layer and said support, said intermediate layer containing a mixed polymerizate produced from vinyl chloride and a compound selected from the group consisting of esters of vinyl alcohol, acrylic acid esters and mixtures thereof, the ester component being more than 40 per cent of said mixed polymerizate.

2. In the process of coating a gelatin layer on the support consisting of polymerized vinyl chloride, the improvement which comprises the inserting of an intermediate layer between said gelatin layer and said support, said intermediate layer containing a cellulose derivative and a mixed polymerizate produced from vinyl chloride and a compound selected from the group consisting of esters of vinyl alcohol, acrylic acid esters and mixtures thereof, the ester component being more than 40 per cent of said mixed polymerizate.

3. In the process of coating a gelatin layer on top of the support consisting of polymerized vinyl chloride, the improvement which comprises inserting an intermediate layer between said gelatin layer and said support, said intermediate layer containing a mixed polymerizate produced from vinyl chloride and a compound selected from the group consisting of esters of vinyl alcohol, acrylic acid esters and mixtures thereof, the ester component being more than 40 per cent of said mixed polymerizate, and coating said intermediate layer with a nitro cellulose lacquer.

4. A material comprising a support consisting of polymerized vinyl chloride, a gelatin layer and an intermediate layer between said support and said gelatin layer, said intermediate layer containing a mixed polymerizate produced from vinyl chloride and a compound selected from the group consisting of esters of vinyl alcohol, acrylic acid esters and mixtures thereof, the ester component being more than 40 per cent of said mixed polymerizate.

5. A material comprising a support consisting of polymerized vinyl chloride, a gelatin layer and an intermediate layer between said support and said gelatin layer, said intermediate layer containing a cellulose derivative and a mixed polymerizate produced from vinyl chloride and a compound selected from the group consisting of esters of vinyl alcohol, acrylic acid esters and mixtures thereof, the ester component being more than 40 per cent of said mixed polymerizate.

6. A material comprising a support consisting of polymerized vinyl chloride, a photographic emulsion layer and an intermediate layer between said support and said gelatin emulsion layer said intermediate layer containing a cellulose derivative and a mixed polymerizate produced from vinyl chloride and a compound selected from the group consisting of esters of vinyl alcohol, acrylic acid esters and mixtures thereof, the ester component being more than 40 per cent of said mixed polymerizate.

7. A material comprising a support consisting of polymerized vinyl chloride, an intermediate layer containing a mixed polymerizate produced from vinyl chloride and a compound selected from the group consisting of esters of vinyl alcohol, acrylic acid esters and mixtures of vinyl alcohol esters and acrylic acid esters, the ester component being more than 40 per cent of said mixed polymerizate, a layer substantially consisting of cellulose nitrate on top of said intermediate layer and a photographic gelatin emulsion layer coated on top of said cellulose nitrate layer.

KURT THINIUS.